Oct. 8, 1968     I. P. KAMINOW     3,405,370

INTERNAL OPTICAL MODULATOR

Filed Jan. 30, 1964

INVENTOR
*I. P. KAMINOW*
BY
*Kenneth W Mateer*

ATTORNEY

United States Patent Office 3,405,370
Patented Oct. 8, 1968

3,405,370
INTERNAL OPTICAL MODULATOR
Ivan P. Kaminow, New Shrewsbury, Eatontown, N.J., assignor to Bell Telephone Laboratories, Incorporated, New York, N.Y., a corporation of New York
Filed June 30, 1964, Ser. No. 379,273
5 Claims. (Cl. 331—94.5)

ABSTRACT OF THE DISCLOSURE

Means for extending the permissible modulation bandwidth of optical maser modulators in which the modulation element is within the optical cavity. By combining an optical maser having a Doppler broadened transition width less than twice the resonator mode spacing with a broadband optical attenuator, cavity resonator modes other than the carrier mode can be suppressed, thereby permitting modulation bandwidths greater than the resonator mode spacing. Critical frequency tuning of the mode suppressor is not required.

---

Figure 1:
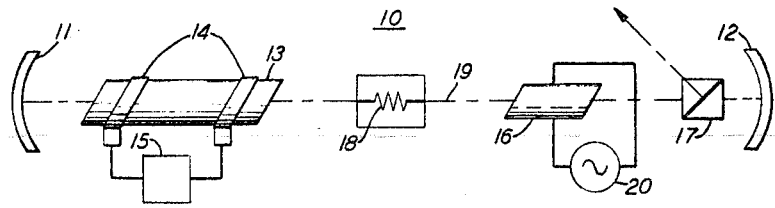

This invention relates to optical masers and, more particularly, to modulation arrangements for use with such devices.

The invention of the optical maser has made possible the generation and amplification of coherent electromagnetic waves in the optical frequency range. This range is generally considered to extend from the farthest infrared portion of the spectrum through the ultraviolet. Since the frequencies involved are extremely high, enormous quantities of information are theoretically capable of being transmitted over optical maser beams.

As developed for use at microwave frequencies, masers typically comprise a negative temperature medium contained within a cavity resonator which has a single resonant mode at or near the frequency at which stimulated emission is to be produced. At such microwave frequencies, typical cavity structures have dimensions of the order of a single wavelength at the desired operating frequency.

Within the range of frequencies associated with optical masers, however, the microwave frequency design approach is impractical due to the extremely small wavelengths involved. Thus, typical optical maser cavity resonators have dimensions which may be thousands of times larger than the operating wavelengths, and they are therefore multimode devices.

One such structure which has been successfully employed in optical masers is the Fabry-Perot interferometer comprising in its simplest form two plane parallel reflective surfaces separated by a gap of convenient length. The active, or negative temperature, medium is located in the gap between the reflective surfaces, at least one of which is partially transmissive to make energy available for external utilization.

One application for such coherent optical energy sources involves communication systems in which the optical signal is a carrier modulated with signal information. A structure recently proposed for modulating optical maser energy comprises a modulation arrangement which is placed within the resonant cavity.

The modulation arrangement typically comprises one component portion which serves to modify a characteristic of the energy within the cavity—such as phase, polarization, or direction—and a second component portion which serves to couple from the cavity a part of the energy which has been thus modified.

However, since the resonant modes in a Fabry-Perot cavity of length L are spaced in frequency at intervals of $c/2L$, where $c$ is the velocity of light, internal cavity modulation can introduce components at a plurality of frequencies at which the cavity is resonant. Thus, if the modulation band is greater than $c/2L$, the sidebands generated in the cavity will include at least two resonant frequencies in addition to the desired carrier. On the other hand, due to the typical nonlinear nature of many modulation arrangements, a modulating frequency producing a component halfway between adjacent cavity modes will also generate a second harmonic component at a resonant frequency of the cavity. Such resonant components remain within the cavity and are reflected by the cavity extremities to pass through the modulation arrangement, whereupon they are themselves modulated as apparent additional carriers. With a single carrier no longer present, the multimode condition within the cavity becomes confused.

One solution to the problem of multimoding, proposed by P. P. Kisliuk and D. A. Kleinman in United States Patent 3,134,837, issued May 26, 1964, involves the addition of an auxiliary cavity surface which introduces, through interference effects, selective mode attenuation. However, the Kisliuk et al. arrangement exhibits a loss characteristic having a position in the frequency plane which is critically dependent upon auxiliary cavity dimensions of the order of wavelengths. The stability problems attendant such an arrangement are substantial.

It is therefore the object of the present invention to modulate an optical maser internally over a broad band of frequencies.

It is a further object of the invention to realize single carrier internal optical maser modulation with spurious mode suppression means free from critical stability adjustments.

The above and other objects are realized in a specific illustrative embodiment of the invention comprising the combination of two spaced reflectors defining the extremities of an optical cavity resonator, means within the cavity resonator for amplitude modulating optical energy propagating between the extremities, a negative temperature medium also positioned between the extremities, and broadband attenuating means positioned within the cavity.

Since the internal modulation arrangement is located in a region of high light intensity, only a small energy fraction need be modulated and coupled from the cavity to produce an effect comparable with that achieved with a larger percent modulation of a beam which is external to the cavity, and which has passed through a partially transmissive resonator extremity.

It is a feature of one specific embodiment of the invention that the internal modulation means comprises an electro-optical device and a polarization selective device adapted to couple a small fraction of the modulated energy from the cavity.

Further aspects of the invention reside in the condition that either the modulating signal have a bandwidth greater than the frequency spacing of adjacent longitudinal resonator modes or that the modulator produce harmonics at a frequency corresponding to a resonator mode.

It is further characteristic of the present invention that the effective half-width of the fluorescent emission line of the negative temperature medium is less than the frequency spacing of adjacent longitudinal resonator modes when all cavity losses are considered.

These and other objects and features of the invention will become more readily apparent upon reference to the accompanying drawing and to the detailed description thereof which follows.

In the drawing:

FIG. 1 is a schematic view of an optical maser in accordance with the invention; and FIGS. 2A, 2B, 2C, and 2D are graphical representations helpful in understanding the invention.

In FIG. 1, optical maser 10 comprises an optical cavity resonator formed by a pair of reflectors 11, 12 which are spaced apart on longitudinal axis 19 and which can be curved, as illustrated, or which can be plane. A negative temperature medium 13, which can be either solid or gaseous, is disposed in the gap between the cavity extremities and is pumped by schematically shown pumping means 14, which are energized by source 15. The character of pumping means 14 is determined in now well-known fashion by the particular active medium selected and by the desired mode of operation. Also, disposed within the gap between reflectors 11, 12 are modulation means 16, 17, and broadband attenuator 18.

Modulation means 16, 17 typically comprises the combination of a polarization changer 16 and a polarization selector 17. As specific examples, polarization changer 16 can comprise an electro-optic material such as potassium dihydrogen phosphate (KDP) which retards, in response to an applied electric field, the phase of light which propagates along the optic axis of the material; or it can comprise any of the well-known magneto-optic materials which rotate the polarization plane of incident energy in response to an applied magnetic field. The resultant effect in either case is proportional to the magnitude of the modulating signal applied from the modulation source, which is indicated as block 20 in the drawing.

In the embodiment of FIG. 1, light is coupled out of the resonant cavity by a selective device 17 which deflects a first polarization and transmits the polarization normal to the first. A Brewster angle window or a separator based on crystalline birefringence, such as a Glan-Thompson prism, can be advantageously used. Specifically with respect to electro-optic element 16, if $\Gamma$ is defined as the net retardation introduced by the cavity elements for a single energy pass, and if the incident optical energy is of the form $E_0 \cos \omega t$, the components transmitted through retarder 16, with polarization parallel and perpendicular respectively to incident energy polarized at 45 degrees to the principal axis of the medium are $$E_{\parallel} = E_0 \cos (\Gamma/2) \cos \omega t$$

$$E_{\perp} = E_0 \sin (\Gamma/2) \sin \omega t$$

The amplitude of the light coupled out is proportional to $\Gamma$ which varies in accordance with the voltage of the signal applied to retarder 16 by source 20. Thus the coupled energy is amplitude modulated.

The resonant cavity formed by reflectors 11, 12 is characterized by a length L measured along axis 19, and by a series of resonant frequencies at optical frequencies spaced apart by $c/2L$. A suitably pumped negative temperature medium disposed within the cavity can be stimulated to emit radiation at a particular one of these resonant cavity modes and the emitted signal will therefore resonate within the cavity. A typical gain-frequency characteristic, centered about frequency $f_1$, is illustrated as curve 31 in FIG. 2A. When internal modulation of the resonating signal occurs, either or both of two effects occur.

First, if the frequency band of the modulating signal exceeds $c/2L$, the characteristic sidebands generated within the cavity include resonant frequencies other than the desired carrier. Second, the nonlinear nature of many typical polarization changing elements 16, gives rise to harmonic frequencies which, if the modulating signal contains a frequency component spaced from the carrier by $nc/L$, occur at resonant frequencies of the cavity other than the desired carrier.

In either situation, energy buildup at undesired resonant frequencies occurs, and the energy, after reflection through the modulation arrangement, is itself modulated as if it were an additional carrier frequency. After several passes between the cavity extremities, such a condition produces uncontrollable modulation at a plurality of spurious carriers.

Figure 2A:
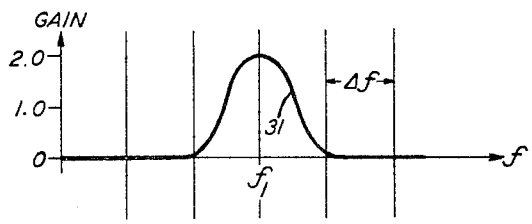
Figure 2B:
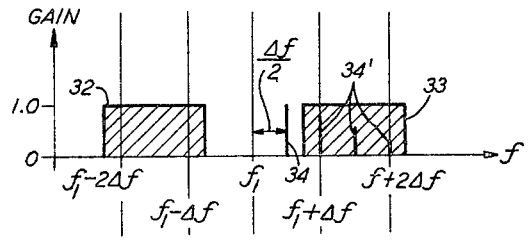
Figure 2C:
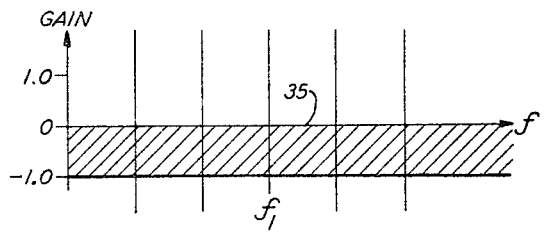

The first situation described is illustrated in FIG. 2B, in which sidebands 32, 33 are displaced about carrier frequency $f_1$ and include resonant cavity frequencies $f_1 \pm \Delta f$ and $f_1 \pm 2\Delta f$. The second situation is illustrated by frequency spike 34 at frequency $f_1 + \Delta f/2$ which causes harmonic amplitudes at multiples of the frequency difference between spike 34 and carrier $f_1$, indicated as spike 34'.

Such undesirable resonance effects can be eliminated in accordance with the present invention by the interposition, within the cavity and along axis 19 of attenuation means 18 which suppresses resonant buildup at all cavity mode frequencies within the range of interest except the carrier frequency. At the desired carrier frequency, of course, the negative temperature medium provides sufficient gain to overcome the attenuator loss. Attenuator 18, which can exhibit the substantially flat frequency characteristic 35 shown in FIG. 2C over the optical frequency band of interest, or some other similar shape not necessarily flat, can comprise a broadband frequency filter such as a Kodak Wratten filter, a Corning glass filter, or calcite. The filter can be positioned along axis 19 as illustrated, or for gas maser arrangements it can comprise an output window which is itself lossy and which forms one extremity of the envelope containing the negative temperature medium. In any case, the loss for each transit of element 18 is advantageously equal to the amplitude of the sideband energy introduced by a single transit of modulation arrangement 16, 17.

Figure 2D:
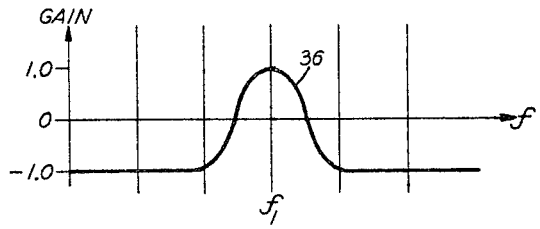

FIG. 2D illustrates the net gain characteristic of the optical maser of FIG. 1. Gain curve 36 is essentially that shown in FIG. 2A for the negative temperature medium-cavity arrangement alone, but displaced downward an amount equal to the loss introduced by attenuator 18. By selecting a medium having a high gain characteristic for the negative temperature medium, stimulated emission at the desired carrier frequency will be permitted, with simultaneous suppression of spurious oscillations at other resonant modes of the cavity arrangement which might be encouraged by the internal modulation effects already discussed. A suitable optical maser medium for this application is the helium-neon gas mixture operating at 3.9 microns.

In all cases, it is understood that the above-described arrangements are illustrative of the principles of the invention. Numerous and varied other embodiments can be devised in accordance with these principles by those skilled in the art without departing from the spirit and scope of the invention. Thus, for example, the modulation arrangement described as the combination of a polarization changer and a polarization selector can comprise an electro-acoustic device in which a portion of the energy is deflected from the main propagation path in response to an applied acoustic signal. In such an embodiment the operations of elements 16, 17 in FIG. 1 are combined in a single element.

What is claimed is:

1. An optical modulator comprising an elongated optical cavity resonator having reflective end members spaced apart along a longitudinal axis, a negative temperature medium disposed within said cavity and along said axis, said medium being adapted to emit coherent energy at a frequency $f_1$ which is a resonant frequency of said cavity, means disposed within said cavity for modulating the energy propagating therewithin, means for coupling a portion of said modulated energy from said cavity, said modulating means introducing modulation components into said cavity at at least one frequency corresponding to a resonant mode of said cavity other than $f_1$, and means for suppressing said modulation components comprising a broadband attenuator disposed within said cavity along said axis, said attenuator raising the losses for all mode frequencies except $f_1$ above the level for which oscillation is possible.

2. The modulator according to claim 1 in which said modulating means comprises a polarization changer and said coupling means comprises a polarization selector.

3. The modulator according to claim 2 in which said polarization changer comprises an electro-optic medium.

4. An optical modulator comprising an elongated optical cavity resonator having reflective end members spaced apart a distance L along a longitudinal axis, a negative temperature medium disposed within said cavity and along said axis, said medium and said cavity exhibiting a net gain which permits oscillation at a substantially single frequency $f_1$ which is a resonant frequency of said cavity, means disposed within said cavity for modulating the energy propagating therewithin over a bandwidth greater than $c/2L$, and means for suppressing energy within said cavity resonant at frequencies $f_1 \pm nc/2L$ where $n$ is an integer different from zero, said means comprising an optical attenuator which introduces loss over a broad frequency band, said loss being equal to or greater than the amplitude of said energy at $f_1 \pm nc/2L$.

5. An optical modulator comprising an elongated optical cavity resonator having reflective end members spaced apart a distance L along a longitudinal axis, a negative temperature medium disposed within said cavity and along said axis, said medium and said cavity exhibiting a net gain which permits oscillation at a substantially single frequency $f_1$ which is a resonant frequency of said cavity, means disposed within said cavity for modulating at frequencies including $mc/L$ the energy propagating therewithin, and means for suppressing resonances at frequencies $f_1 \pm nc/2L$ where $m$ and $n$ are integers different from zero, said means comprising an optical attenuator which introduces loss over a broad frequency band, said loss being equal to or greater than the amplitude of said energy at $f_1 \pm nc/2L$.

References Cited

UNITED STATES PATENTS 3,229,223   1/1966   Miller _____ 331—94.5

OTHER REFERENCES

Collins et al.: "Interferometric Laser Mode Selector," Lasers and Applications, ed. W. S. C. Chang, Ohio State U. Press, Aug. 1, 1963.

JEWELL H. PEDERSEN, *Primary Examiner.*

R. L. WIBERT, *Assistant Examiner.*